United States Patent [19]

Hanna et al.

[11] E Re. 30,026

[45] Reissued Jun. 12, 1979

[54] VEHICLE CONVEYOR

[75] Inventors: Daniel C. Hanna, 1133 SW. Rivington Dr., Portland, Oreg. 97201; James S. Richardson, Arleta, Calif.

[73] Assignee: Daniel C. Hanna, Portland, Oreg.

[21] Appl. No.: 816,505

[22] Filed: Jul. 18, 1977

Related U.S. Patent Documents

Reissue of:

[64] Patent No.: 3,554,132
Issued: Jan. 12, 1971
Appl. No.: 639,861
Filed: May 19, 1967

[51] Int. Cl.[2] ..... B65G 19/22

[52] U.S. Cl. ..... 104/172 B; 104/178; 198/732

[58] Field of Search ..... 104/172 B, 172 C, 172 BT, 104/178, 18, 25, 44, 48; 198/732, 733

[56] References Cited

U.S. PATENT DOCUMENTS

| | | | |
|---|---|---|---|
| 425,139 | 4/1890 | Mercer et al. | 198/693 |
| 762,311 | 6/1904 | Hopkins | 104/172 C |
| 795,124 | 7/1905 | Hetzel | 198/732 |
| 1,256,474 | 2/1918 | Grabowski | 104/172 B |
| 1,814,262 | 7/1931 | Redford | 104/172 B |
| 1,822,797 | 9/1931 | Birmann | 198/719 |
| 2,621,610 | 12/1952 | Boyko et al. | 104/172 C |
| 2,780,342 | 2/1957 | Good | 198/732 |
| 3,058,433 | 10/1962 | Hurst | 104/172 B |
| 3,196,806 | 7/1965 | Brunder | 104/172 B |
| 3,225,896 | 12/1965 | Krueger | 198/732 |
| 3,260,219 | 7/1966 | Vani | 104/172 |
| 3,329,255 | 7/1967 | Dulieu | 198/732 |
| 3,403,635 | 10/1968 | Smith | 104/172 B |

FOREIGN PATENT DOCUMENTS

| | | | |
|---|---|---|---|
| 1915081 | 12/1964 | Fed. Rep. of Germany | 104/172 B |
| 49256 | 2/1965 | Poland | 104/172 B |

*Primary Examiner*—Robert W. Saifer
*Attorney, Agent, or Firm*—Klarquist, Sparkman, Campbell, Leigh, Hall & Whinston

[57] ABSTRACT

A vehicle conveyor suitable for a car wash is described wherein tire-engaging rollers are attached to a continuous chain positioned underneath the path of the vehicle. The rollers are normally carried by the chain in a non-engaging position below the vehicle track. Then, when movement of the vehicle is desired, a coin-actuated control or a manual control is actuated to move a cam into operative position to cam one of the rollers upwardly through a slot onto the top surface of the vehicle track where it engages the vehicle's tire. The roller subsequently drops through a slot proximate the end of the conveyor course.

3 Claims, 4 Drawing Figures

VEHICLE CONVEYOR

Matter enclosed in heavy brackets [ ] appears in the original patent but forms no part of this reissue specification; matter printed in italics indicates the additions made by reissue.

BACKGROUND OF THE INVENTION

Car wash conveyors have heretofore been proposed for contacting the vehicle tire instead of the vehicle's frame or bumper, this type of conveyor having the advantage of avoiding possible damage to the vehicle. A conveyor of this type would conventionally include tire-engaging rollers, or the like, positioned in the vehicle track. The services of an attendant are required for proper positioning of the vehicle and then proper positioning of the conveyor rollers relative to the vehicle. One purpose of the present invention is to avoid these adjustments by providing a tire-engaging conveyor with tire-engaging members which are remotely and semiautomatically positionable at the proper location. Thus, in a nonattended or coin operated car wash, a coin-operated switching means can then be used to bring the tire-engaging means into position and operation.

SUMMARY OF THE INVENTION

An endless conveyor chain carrying pushers is mounted for travel below a vehicle path. The pushers are below and are movable by a selectively operable guide to the level of the path when the guide is moved to its operative position by a remote control device.

According to a preferred embodiment, the vehicle-engaging members include tire-engaging rollers secured to a conveyor chain by arms hingedly attached to the conveyor chain. The conveyor chain is located underneath a horizontal track along which a vehicle tire may be located, the track being provided with a longitudinal slot of a size for receiving the arm of the vehicle-engaging member. This slot is enlarged near the forward end of the conveyor course to provide an opening through which a tire-engaging roller may pass to the top surface of the vehicle track. Lifter means are employed for guiding or camming the roller from the course of the conveyor, below the vehicle track, upwardly along the track where the roller is then constrained to move. At this time the arm of the tire-engaging member extends through the slot in the track. Toward the end of the conveyor course, the longitudinal slot is again enlarged by an opening through which the roller may drop back for return travel below the track.

The vehicle-engaging member is also preferably provided with a second roller located between the tire-engaging roller and the chain along the arm joining the two. This roller normally aids in carrying a vehicle-engaging member along a channel underneath the vehicle track. However, when the tire-engaging roller engages the vehicle tire, this second roller may be urged upwardly to ride along the underside of the vehicle track. This prevents dragging of the conveyor chain on the track and also prevents undue tension on the chain through excessive removal of the chain from its usual course. Spring biased chain takeup means are also provided so that some variation in the course taken by the chain is permissible.

It is accordingly an object of the present invention to provide improved vehicle conveyor apparatus for selectively and controllably engaging a vehicle.

It is a further object of the present invention to provide an improved vehicle conveyor apparatus for selectively engaging a tire of a vehicle along a track taken thereby, and including tire-engaging means which normally follows a path of nonengagement with the vehicle tires.

It is a further object of the present invention to provide a vehicle [c] *conveyor apparatus* having tire-engaging means normally positioned on a course underneath the track of the vehicle tire, and which may be controllably and remotely upraised to engage the vehicle tire.

The subject matter which we regard as our invention is particularly pointed out and distinctly claimed in the concluding portion of this specification. The invention, however, both as to organization and method of operation, together with further advantages and objects thereof, may best be understood in connection with the accompanying drawings wherein like reference characters refer to like elements.

DRAWINGS

DETAILED DESCRIPTION

Figure 1:
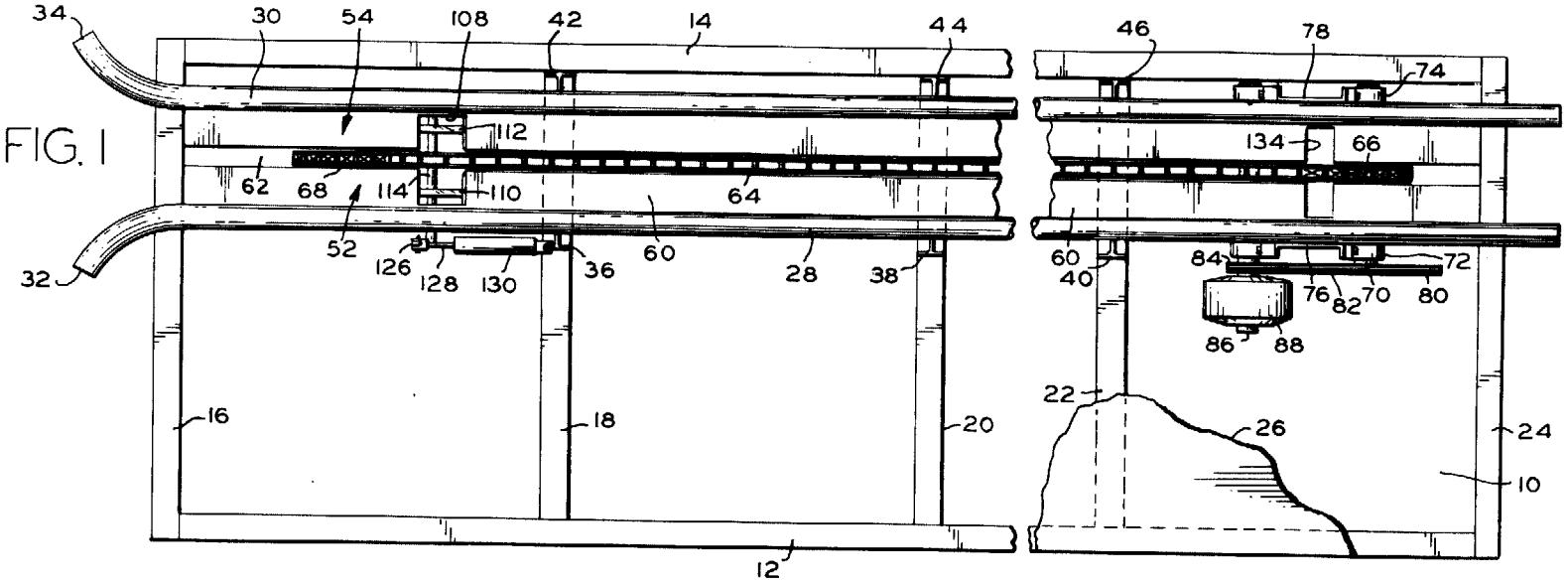
FIG. 1 is a plan view of the conveyor apparatus according to the present invention.

Referring to the drawings, a conveyor apparatus according to the present invention is suitably employed in a car wash, or the like, and is mounted in a pit 10 provided with concrete walls. A frame, including side members 12 and 14, also includes cross members 16, 18, 20, 22 and 24 which are positioned at the top edge of the pit and which carry top decking 26. A vehicle such as an automobile may be driven over pit 10 with the tires on one side thereof being guidable over a track between guide rails 28 and 30 suitably formed of pipe, and which guide rails are flared apart at 32 and 34 whereby to guide the vehicle tire upon the track. The rails 28 and 30 are supported on upright beams 36, 38, 40, 42, 44 and 46 as well as upon end members 48 and 50. The rails, the upright beams and the end members form an integral frame which carries the other elements of the conveyor and forms therewith a unitary structure which can be shipped and installed in the pit as a unit.

The vehicle track itself is formed by a pair of steel angles 52 and 54 extending longitudinally of the pit, angle 52 being supported by upright beams 36, 38 and 40, and angle 54 being supported by upright beams 42, 44 and 46. The lower or side flanges 56 and 58 of angles 52 and 54 are suitably welded to the upright beams. The angles 52 and 54 are also secured to the frame cross members 16 and 24 on either end. The upper or top flanges of angles 52 and 54 provide the vehicle track itself, and will be designated herein by reference numeral 60.

Figure 2:
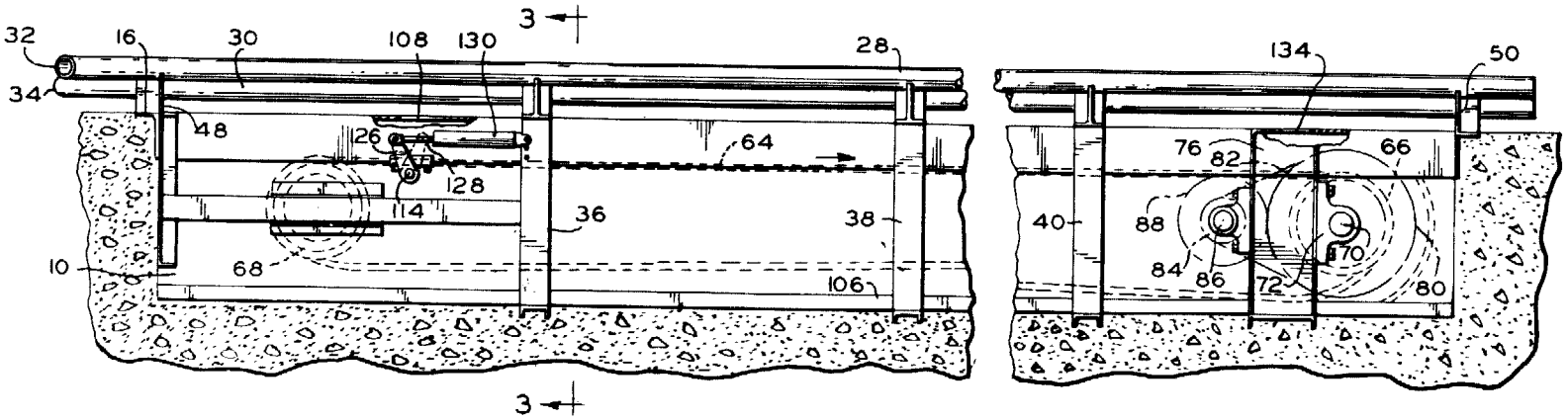
FIG. 2 is an elevation of the FIG. 1 conveyor apparatus.
Figure 4:
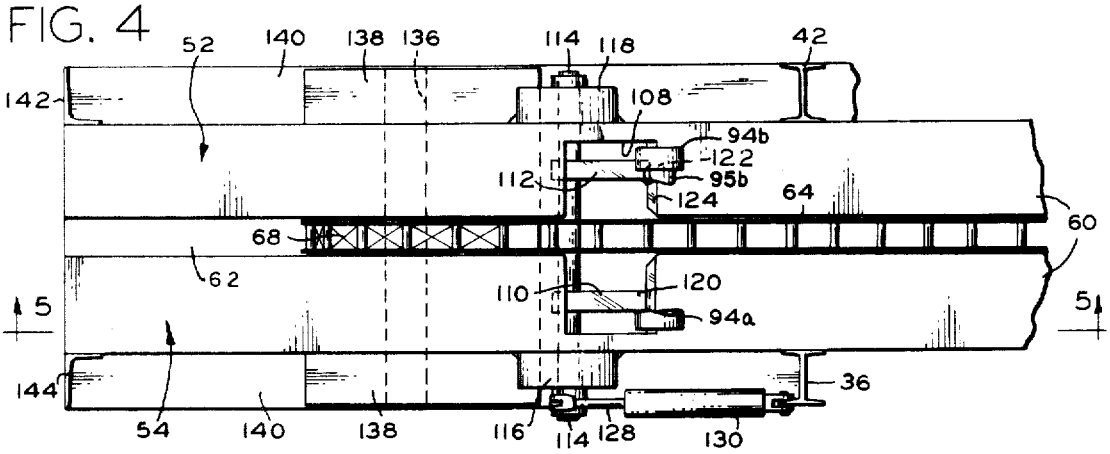
FIG. 4 is a detail drawing illustrating lifter means employed with the FIG. 1 apparatus.

The track 60 includes a central slot 62 running longitudinally for substantially the entire length of such track, the slot being formed by the spacing between the top flanges of angles 52 and 54. Parallel to and substantially directly underneath slot 62, a conveyor in the form of a conveyor chain 64 extends substantially longitudinally of the track. This conveyor chain is carried between a drive sprocket 66 at one end of the conveyor and takeup sprocket 68 at the other or starting end of the conveyor. Sprocket 66 is secured to a drive shaft 70, journaled in bearings 72 and 74 attached to upright channels 76 and 78 respectively. A pulley 80 is also secured to one end of drive shaft 70 for receiving drive belt 82 driven from pulley 84 secured upon the shaft 86 of electric motor drive 88. The upper course of the conveyor chain is driven by the drive sprocket in a direction from left to right as viewed in FIGS. 1, 2, 4, 5 and 6. As illustrated in FIG. 2, the upper course of conveyor chain 64 is substantially horizontal, being carried by a flanged channel 104. The lower course of the conveyor chain 64 travels along a lower track 106 and, in FIG. 2, is illustrated as being upraised slightly, the purpose of which is to avoid interference with a water sump wall (not shown) in pit 10. Of course, the conveyor can be substantially any desired length and is broken at the center in the illustration only for ease in pointing out the salient features of the invention.

Figure 3:
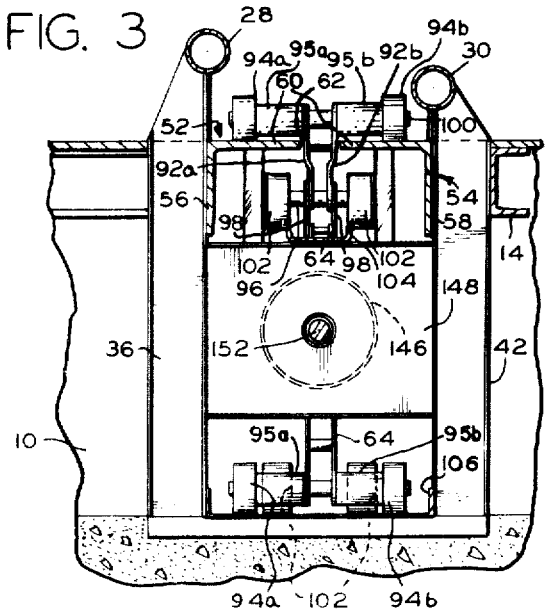
FIG. 3 is a cross section taken at 3—3 in FIG. 2.

The conveyor chain carries therealong one or more vehicle-engaging members 90 each comprising an arm 92 hingedly connected to the conveyor chain, and a guide roller 94 at the opposite or free end of the arm. Arm 92 is conveniently formed of spaced side members 92a and 92b which are joined together and which are illustrated in FIG. 3. These side members are rotatable upon a shaft 96 carried on triangular conveyor chain side links 98, these side links extending upwardly from the top course of the chain so as to position shaft 96 upwardly therefrom. At its outer extremity arm 92 carries a shaft 100 extending through side members 92a and 92b. At the respective ends of shaft 100, the shaft 100 rotatably carries roller means comprising guide roller 94 including end portions 94a and 94b, and also comprising tire-engaging roller portions 95a and 95b located between the guide roller portions and the side members. The roller 94 and the roller portions 95a and 95b are free to rotate in opposite directions. Roller portions 95a and 95b are smaller in diameter than roller 94.

Also, rotatably carried on arm 92 and specifically upon shaft 96 is another two-part roller 102 which normally rides on the stepped channel or pan 104 extending along and underneath the upper course of the conveyor chain. The two parts of the roller 102 ride on the upper horizontal flanges of pan 104, and conveyor chain 64 lies along a central, depressed portion of the pan. The longitudinal extent of roller 102 is less than the combined length of roller portions 94a and 94b plus roller portions 95a and 95b for clearance reasons. Also, the upper horizontal flanges of pan 104 extend substantially no further than the longitudinal extent of roller 102.

Normally the conveyor chain 64 transports vehicle-engaging members 90 therealong with both rollers 94 and 102 riding on the upper horizontal flanges of pan 104 along the upper course of the conveyor. The same rollers ride along lower pan 106 on the return course. Thus, no part of the conveyor or the vehicle-engaging members normally extend above the upper surface of the track 60. The track 60 may be viewed as a slotted closure located between the path of the vehicle and the normal path of the vehicle-engaging member along the conveyor. However, slot 62 is wide enough to pass arm 92 whereby roller 94 and shaft 100 carrying tire-engaging roller portions 95a and 95b may be extended onto the upper surface of track 60. The guide roller 94 is raised onto the top surface of track 60 through an enlarged portion or opening 108 which may be described as a lateral enlargement of slot 62. This opening 108 is sufficiently large to permit guide roller 94 and roller portions 95a and 95b to move freely therethrough.

Figure 5:
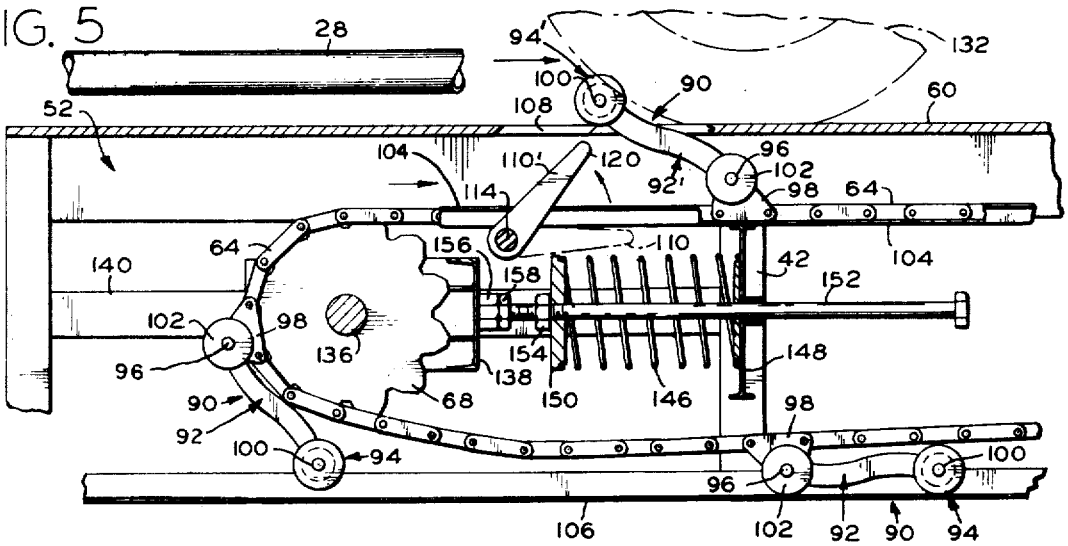
FIG. 5 is a cross-sectional detail taken at 5—5 in FIG. 4 illustrating the upward camming of the tire-engaging roller according to the present invention.

For the purpose of raising roller 94 and tire-engaging roller portions 95a and 95b to the upper surface of track 60, the apparatus according to the present invention is provided with lifter means in the form of a pair of camming or guide arms 110 and 112 secured upon shaft 114. Shaft 114 is journaled in bearings 116 and 118 locating the shaft just below the upper course of conveyor chain 64 so the shaft extends in a horizontal direction perpendicular to the longitudinal direction of the track. The shaft 114 is also positioned such that camming arms 110 and 112, when upraised, will position their tip ends 120 and 122 adjacent a downwardly beveled edge 124 of opening 108. This edge is the edge initially farthest from roller 94 in the direction of movement of roller 94. Camming arms 110 and 112 rotate upwardly to a position as illustrated in FIG. 5 at 110' the arms having moved past the ends of roller 102 and the side edges of pan 104. Shaft 114 has secured thereupon a bellcrank 126 rotatably attached to the operating rod 128 of hydraulic or pneumatic cylinder 130, the latter being rotatably secured to upright beam 36. Operation of the cylinder 130 forces operating rod 128 outwardly, rotating shaft 114 and raising the camming arms from the lower position to the upper position as illustrated at 110' in FIG. 5 whereby tips 120 and 122 are proximate the aforementioned beveled edge of opening 108. With the camming arms 110 and 112 thus upraised, the guide roller portions 94a and 94b, when encountering the camming arms, will travel up along the camming arms and out opening 108 to the top surface of track 60, as arm 92 rotates around shaft 96. The position of the guide roller on the top surface of track 60 is illustrated at 94' in FIG. 5. The arm at 92' extends through the slot 62. The tire-engaging roller portions 95a and 95b are now in position to engage vehicle tire 132.

In the apparatus according to the present invention, an automobile may be driven onto the apparatus with the tires on one side being guided onto track 60 between the guide rails 28 and 30. When a tire, 132, is positioned beyond opening 108, the cylinder 130 may be actuated as by means of a remotely operated mechanism 133 which may be a coin operated device. The mechanism 133 is so located that, when the driver seated in the vehicle is adjacent the mechanism 133, at least one of the wheels of the vehicle is on the track 54 in advance of the opening 108. The motor drive 88 is also started thereby such that the conveyor chain and sprockets turn in a clockwise direction as indicated. One of the rollers 94 theretofore positioned underneath track 60 will now be cammed upwards to the surface of track 60 causing its tire-engaging roller portions 95a and 95b to engage tire 132 and propel the vehicle to the right. As the vehicle moves to the right, roller portion 94a rotates in a clockwise direction as it rolls along track 60, but tire engaging roller portions 95a and 95b rotate in a counter clockwise direction as they engage rolling tire 132.

Figure 6:
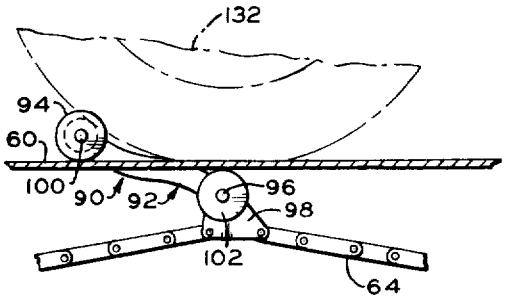
FIG. 6 illustrates the position of the vehicle-engaging member in urging contact with a vehicle tire.

It will be understood that considerable pulling force may be exerted upon the vehicle-engaging member 90 by chain 64 such that the chain 64 is placed under tension between vehicle-engaging member 90 and drive sprocket 66. The chain under tension is illustrated in FIG. 6, where it is seen the chain tends to rise upwardly toward the underside of track 60. However, roller 102 at this time engages the underside of track 60 and rotates in a counterclockwise direction such that neither vehicle-engaging member 90 nor chain 64 will drag upon the track. Thus, roller 102 maintains chain 64 near its normal path but slightly raised from the pan 104. The movement of chain 64 out of its regular path is minimized and a smooth bearing is provided between the chain and track 60 by means of roller 102.

Before further vehicle-engaging members 90 approach opening 108, the cylinder 130 is actuated to retract the arms 110 and the successive roller assemblies will continue to travel below the track 60. However, upon further actuation of the coin-actuated mechanism another roller assembly will be raised. Thus, more than one vehicle will be continuously moved along the track if desired.

Toward the end of the upper course of the conveyor chain there is located a second enlarged portion along slot 62 providing an opening 134. As rollers 94 and roller portions 95a and 95b reach the opening 134, these rollers drop through the opening toward pan 104 so that the tire-engaging members may be returned along the lower course of the conveyor chain. It is understood that pan 104 extends no further than between sprockets 66 and 68, and more particularly no further than between points vertically above the sprocket axes.

Due to the tension placed on the chain, and the slight upraising thereof as hereinbefore discussed with reference to FIG. 6, and further because of shock loads that may occur, it is desirable to provide a tensioned takeup means at one end of the conveyor chain. Such means is illustrated in FIG. 5. Sprocket 68 is positioned on shaft 136 supported at either side on a movable carriage 138. Carriage 138 slides along guide rails 140 at either side thereof secured underneath the track. One guide rail 140 is supported between beam 42 and an angle 142 extending downwardly from angle 52 forming a part of the track. The other guide rail 140 is similarly supported between beam 36 and angle 144 extending downwardly from angle 54, forming a part of the track. Carriage 138 is urged to the left along rails 140 by means of a tensioning spring 146, such tensioning spring being constrained by the vertical plate 148 and end retainer 150. A threaded pressure rod 152 extends coaxially of the spring through an aperture in plate 148 and a similar aperture in retainer 150 at which point the pressure rod is threaded to receive nut 154. Nut 154 secures retainer 150 against the end of the spring 146. The pressure rod 152 is further secured at its threaded end to a threaded connection 156 on the end of carriage 138 and a lock nut 158 may be used for maintaining the proper connection.

Plate 148 is secured between upright beams 36 and 42 as by welding and therefore firmly establishes the position of one end of the spring 146. The upper flange of plate 148 also supports the under side of pan 104, this pan being similarly supported therealong by other cross members (not shown).

The tensioning means may be adjusted by means of turning nut 154 on the threaded pressure rod so as to place spring 146 in a greater or lesser degree of compression. The spring urges retainer 150 to the left, bearing on nut 154 and rod 152, yieldably urging carriage 138 to the left along rails 140. Thus, the sprocket 68 tensions the chain 64 at its forward end, but may yield somewhat with upward movement of the chain such as illustrated in FIG. 6, or on the occasion of shock loads or the like.

While we have shown and described a preferred embodiment of our invention, it will be apparent to those skilled in the art that many changes and modifications may be made without departing from our invention in its broader aspects. We therefore intend the appended claims to cover all such changes and modifications as fall within the true spirit and scope of our invention.

We claim:

[1. Conveyor apparatus for transporting a vehicle including a conveyor and at least one member carried by said conveyor and adapted to engage said vehicle for moving said vehicle:

which is noncoincident with said vehicle;

control means for selectively positioning said member into an engagement path with said vehicle along said conveyor;

a slotted closure between the path of said vehicle and the normal path of said member;

said control means being effective to urge at least a portion of said member past said closure into an engagement path with said vehicle, at least a portion of said member then extending through the slot in the closure;

said slotted closure comprising a horizontal track along the top of which a tire of said vehicle is adapted to travel in the direction of the slot therein;

said conveyor being disposed below said track and along said slot;

said member including a roller means and an arm hingedly connecting said roller means to said conveyor wherein said arm is adapted to pass through the slot in the track;

the slot in said track having an enlarged portion through which said roller means may be urged;

said control means comprising lifter means for raising said roller means through said enlarged portion and onto the upper surface of said track; and said arm being provided with an additional roller positioned on said arm between the first-mentioned roller means and said conveyor for engaging the under surface of said track as said first-mentioned roller means engages a vehicle tire.]

[2. Conveyor apparatus for transporting a vehicle comprising:

a horizontal track along which tires of said vehicle are adapted to travel, said track being provided with a longitudinal slot extending in the direction of travel of said vehicle tire;

a conveyor chain positioned for travel below said track and along said slot;

means for driving said conveyor chain;

a plurality of vehicle-engaging members rotatably connected to the said conveyor chain at spaced points therealong and movable therewith, each including an arm rotatably connected to said conveyor chain and adapted to pass through said slot, and each said arm carrying a vehicle tire-engaging roller means at a point thereon extended from the conveyor chain;

at least a portion of said slot in said track being enlarged to pass the tire-engaging roller means from a position below said track to a position on the upper surface of said track;

a controllable lifter member for camming said tire-engaging roller means through said enlarged portion to the upper surface of said track, said arm then extending through said slot; and said roller means including a first roller for riding on said track and a second roller for contacting a vehicle tire.]

[3. The apparatus according to claim 2 wherein said first and second rollers are mounted for opposite rotation on a single shaft secured to said arm, said first roller being larger in diameter than said second roller.]

[4. The apparatus according to claim 2 wherein an enlarged portion of said slot is located proximate one end of the conveyor chain and wherein said track slot has a second enlarged portion near the opposite end of said conveyor chain through which said roller means may drop after being transported along the top surface of said track intermediate said enlarged portions by said conveyor chain.]

[5. The apparatus according to claim 2 wherein said controllable lifter member comprises at least one camming arm rotatable upon a horizontal axis perpendicular to the longitudinal direction of said track;

said rotatable arm being positioned below the enlarged portion of said slot; and said arm being rotatable into the path of said vehicle-engaging member with an upper portion of said arm adjoining said track near the edge of said enlarged portion farthest from said tire-engaging roller means to cause said tire-engaging roller means to travel upwardly along said rotatable camming arm onto the top surface of said track.]

[6. The apparatus according to claim 5 including two rotatable camming arms wherein such rotatable camming arms are disposed on either side of said conveyor chain and affixed to a shaft passing below the upper course of the conveyor chain, and further including a controllable means for rotating said shaft for lifting said camming arms.]

[7. The apparatus according to claim 5 wherein said vehicle-engaging members include a second roller means located between said tire-engaging roller means and said conveyor chain adapted to engage the under surface of said track as said tire-engaging roller means engages a tire of said vehicle;

each said tire-engaging roller means being formed in two parts, one on either side of said arm, for travel upon the upper surface of said track on either side of said slot, each part of said tire-engaging roller means including rollers for bearing on the track and smaller diameter rollers for bearing on a vehicle tire;

wherein each said second roller means is also formed in two parts with one part carried on each side of said conveyor chain, said tire-engaging roller means having a total longer longitudinal dimension than said second roller means; and said track bearing rollers being engageable by a pair of said rotatable camming arms at longitudinal portions of said track bearing rollers beyond the longitudinal extent of said second roller means.]

[8. The apparatus according to claim 2 further including takeup means at one end of said conveyor chain.]

[9. The apparatus according to claim 2 further including guide rails on either side of said track.]

[10. Conveyor apparatus for transporting a vehicle comprising:

a horizontal track along which tires of said vehicle are adapted to travel, said track being provided with a longitudinal slot extending in the direction of travel of said vehicle tire;

a conveyor chain positioned for travel below said track and along said slot;

means for driving said conveyor chain;

a plurality of vehicle-engaging members rotatably connected to the said conveyor chain at spaced points therealong and movable therewith, each including an arm rotatably connected to said conveyor chain and adapted to pass through said slot, and each said arm carrying a vehicle tire-engaging roller means at a point thereon extended from the conveyor chain;

at least a portion of said slot in said track being enlarged to pass the tire-engaging roller means from a position below said track to a position on the upper surface of said track;

a controllable lifter member for camming said tire-engaging roller means through said enlarged portion to the upper surface of said track, said arm then extending through said slot; and said vehicle-engaging members including a second roller means located between the tire-engaging roller means and said conveyor chain, said second roller means being adapted to engage the under surface of said track as said tire-engaging roller means engages a tire of said vehicle.]

[11. The apparatus according to claim 10 further provided with a supporting channel along and under the upper course of said conveyor chain and along which said second roller means normally travels when the tire-engaging roller means do not engage a tire.]

*12. Conveyor apparatus for transporting a vehicle including a conveyor and at least one member carried by said conveyor and adapted to engage said vehicle for moving said vehicle:*

*said member normally following a path along said conveyor which is noncoincident with said vehicle;*

*control means for selectively positioning said member into an engagement path with said vehicle along said conveyor;*

*a slotted closure between the path of said vehicle and the normal path of said member;*

*said control means being effective to urge at least a portion of said member past said closure into an engagement path with said vehicle, at least a portion of said member then extending through the slot in the closure;*

*said slotted closure comprising a horizontal track along the top of which a tire of said vehicle is adapted to travel in the direction of the slot therein;*

*said conveyor being disposed below said track and along said slot;*

*said member including a roller means and an arm hingedly connecting said roller means to said conveyor wherein said arm is adapted to pass through the slot in the track;*

*the slot in said track having an enlarged portion through which said roller means may be urged;*

*said control means comprising lifter means for raising said roller means through said enlarged portion and onto the upper surface of said track;*

*said arm being provided with an additional roller positioned on said arm between the first-mentioned roller*

*means and said conveyor for engaging the under surface of said track as said first-mentioned roller means engages a vehicle tire;*

*said first-mentioned roller means being formed in two parts, one on either side of said arm, for travel upon the upper surface of said track on either side of said slot, each part of said first-mentioned roller means including rollers for bearing on the track and smaller diameter rollers for bearing on said vehicle tire;*

*wherein said additional roller is also formed in two parts with one part carried on each side of said conveyor, said first-mentioned roller means having a total longitudinal dimension longer than said additional roller; and*

*said track bearing rollers being engageable by said lifter means at longitudinal portions of said track bearing rollers beyond the longitudinal extent of said additional roller.*

*13. Apparatus according to claim 12, further provided with horizontal track means positioned along and under the upper course of said conveyor and along which said additional roller normally travels to support said conveyor when said first-mentioned roller means do not engage a tire.*

*14. Conveyor apparatus for transporting a vehicle comprising:*

*a horizontal track along which tires of said vehicle are adapted to travel, said track being provided with a longitudinal slot extending in the direction of travel of said vehicle tire;*

*a conveyor chain positioned for travel below said track and along said slot;*

*means for driving said conveyor chain;*

*a plurality of vehicle-engaging members rotatably connected to the said conveyor chain at spaced points therealong and movable therewith, each including an arm rotatably connected to said conveyor chain and adapted to pass through said slot, and each said arm carrying a vehicle tire-engaging roller means at a point thereon extended from the conveyor chain;*

*at least a portion of said slot in said track being enlarged to pass the tire-engaging roller means from a position below said track to a position on the upper surface of said track;*

*a controllable lifter member for camming said tire-engaging roller means through said enlarged portion to the upper surface of said track, said arm then extending through said slot;*

*said roller means including a first roller for riding on said track and a second roller for contacting a vehicle tire;*

*said controllable lifter member comprising at least one camming arm rotatable upon a horizontal axis perpendicular to the longitudinal direction of said track;*

*said rotatable camming arm being positioned below the enlarged portion of said slot;*

*said camming arm being rotatable into the path of said vehicle-engaging member with an upper portion of said arm adjoining said track near the edge of said enlarged portion farthest from said tire-engaging roller means to cause said tire-engaging roller means to travel upwardly along said rotatable camming arm onto the top surface of said track;*

*said vehicle-engaging members including a second roller means located between said tire-engaging roller means and said conveyor chain adapted to engage the under surface of said track as said tire-engaging roller means engages a tire of said vehicle;*

*each said tire-engaging roller means being formed in two parts, one on either side of said first-mentioned arm, for travel upon the upper surface of said track on either side of said slot, each part of said tire-engaging roller means including rollers for bearing on the track and smaller diameter rollers for bearing on a vehicle tire;*

*wherein each said second roller means is also formed in two parts with one part carried on each side of said conveyor chain, said tire-engaging roller means having a total longitudinal dimension longer than said second roller means; and*

*said track bearing rollers being engageable by a pair of said rotatable camming arms at longitudinal portions of said track bearing rollers beyond the longitudinal extent of said second roller means.*

* * * * *